(12) United States Patent
Moon et al.

(10) Patent No.: US 8,169,800 B2
(45) Date of Patent: May 1, 2012

(54) POWER CONVERTER, SWITCHING CONTROL DEVICE THEREOF, AND DRIVING METHOD THEREOF

(75) Inventors: Sang-Cheol Moon, Bucheon (KR); Hang-Seok Choi, Gunpo (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 451 days.

(21) Appl. No.: 12/472,156

(22) Filed: May 26, 2009

(65) Prior Publication Data

US 2010/0014331 A1 Jan. 21, 2010

(30) Foreign Application Priority Data

Jul. 15, 2008 (KR) .................. 10-2008-0068531

(51) Int. Cl.
*H02M 3/335* (2006.01)
(52) U.S. Cl. ...................... 363/21.16; 363/97
(58) Field of Classification Search ............ 363/95, 363/97, 21.01, 21.07–21.09, 21.12, 21.15–21.18
See application file for complete search history.

(56) References Cited

U.S. PATENT DOCUMENTS

| | | | |
|---|---|---|---|
| 5,812,383 A * | 9/1998 | Majid et al. ............... | 363/21.05 |
| 6,188,578 B1 | 2/2001 | Lin et al. | |
| 6,385,061 B1 | 5/2002 | Turchi et al. | |
| 6,646,894 B2 | 11/2003 | Hong et al. | |
| 7,054,169 B2 | 5/2006 | Huh et al. | |
| 7,079,404 B2 | 7/2006 | Hong et al. | |
| 7,218,532 B2 | 5/2007 | Choi et al. | |
| 2005/0281062 A1 * | 12/2005 | Choi et al. ............... | 363/21.08 |
| 2006/0291258 A1 * | 12/2006 | Zhu et al. ............... | 363/21.12 |
| 2007/0195559 A1 * | 8/2007 | Gong ...................... | 363/21.01 |

* cited by examiner

*Primary Examiner* — Adolf Berhane
*Assistant Examiner* — Emily Pham
(74) *Attorney, Agent, or Firm* — Okamoto & Benedicto LLP

(57) ABSTRACT

A power converter according to the present invention includes a power supply unit, an output unit, and a switching controller. The power supply unit includes a primary coil of a transformer that receives an input voltage, a gate electrode, and a switch having a first electrode and a second electrode that is connected to the primary coil. The output unit includes a secondary coil of the transformer, and outputs an output voltage that is converted from the input voltage by the transformer. The switching controller includes a feedback terminal that receives a feedback voltage corresponding to the output voltage, generates a burst voltage by compensating the feedback voltage according to a maximum current value that can flow between the second electrode and the first electrode of the switch, determines whether to perform a burst mode operation according to the burst voltage, and transmits a gate signal according to performance of the burst mode operation to the gate electrode of the switch.

17 Claims, 4 Drawing Sheets

POWER CONVERTER, SWITCHING CONTROL DEVICE THEREOF, AND DRIVING METHOD THEREOF

CROSS-REFERENCE TO RELATED APPLICATION

This application claims priority to and the benefit of Korean Patent Application No. 10-2008-0068531 filed in the Korean Intellectual Property Office on Jul. 15, 2008, the entire contents of which are incorporated herein by reference.

BACKGROUND OF THE INVENTION (a) Field of the Invention

The present invention relates to a power converter. More particularly, it relates to a power converter that controls a burst voltage, and a switching controller and a driving method of the power converter.

(b) Description of the Related Art

A power converter, for example a switching mode power supply (SMPS), rectifies an input AC voltage to an input DC voltage and converts the input DC voltage to a DC output voltage having a different level. The power converter is mainly applied to electronic devices, for example power supply devices such as a mobile phone, a computer, and a television.

The electronic device has a normal operation mode that consumes a relatively large amount of power and a standby mode that consumes a relatively small amount of power.

The power converter performs a burst mode operation that performs a switching operation of the power converter for a predetermined time period according to a feedback voltage in order to reduce power consumption during the standby mode, and then stops the switching operation for a predetermined time period. For this, the power converter determines whether to perform the burst mode operation by comparing the feedback voltage with a burst reference voltage.

When a current limit value of a current flowing to a switch of a primary side of a transformer can be determined, the power converter can be newly designed by changing the current limit value, and in this case, a feedback voltage of the new power converter is changed compared to that of a conventional power converter. In this condition, whether to perform the burst mode operation is determined by comparing the feedback voltage with the burst reference voltage, and the burst operation cannot be performed at a desired load due to the changed feedback voltage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power converter that can normally perform a burst mode operation, a switching controller thereof, and a driving method thereof.

A power converter according to an exemplary embodiment of the present invention includes a power supply unit, an output unit, and a switching controller. The power supply unit includes a primary coil of a transformer that receives an input voltage and a switch having a gate electrode, a first electrode and a second electrode that is connected to the primary coil. The output unit includes a secondary coil of the transformer, and outputs an output voltage that is converted from the input voltage by the transformer. The switching controller includes a feedback terminal that receives a feedback voltage corresponding to the output voltage, generates a burst voltage by compensating the feedback voltage according to a maximum current value that can flow between the second electrode and the first electrode of the switch, determines whether to perform a burst mode operation according to the burst voltage, and transmits a gate signal according to performance of the burst mode operation to the gate electrode of the switch.

A switching controller according to another exemplary embodiment of the present invention is provided to a power converter that includes a transformer having a primary coil receiving an input voltage and a secondary coil transmitting an output voltage, and a switch having a control electrode, a first electrode, and a second electrode connected to the primary coil. The switching controller includes a current source, a burst voltage controller, a first comparator, and a gate signal generator. The current source is connected to a node to which a feedback voltage corresponding to the output voltage is applied and supplies a current to the node, and a burst voltage controller is connected between a current limit terminal that determines the maximum current value between the second and first electrodes of the switch and the node, and generates a burst voltage by compensating the feedback voltage according to a current flowing between the node and the current limit terminal. The first comparator generates a burst control signal by comparing the burst voltage with a burst reference voltage. The gate signal generator generates a gate signal that turns on/off the switch according to a first signal and the burst control signal, and the first signal is generated by comparison between a first voltage corresponding to the feedback voltage and a second voltage according to the current flowing between the first and second electrodes of the switch.

A driving method according to another exemplary embodiment of the present invention is provided to a power converter that includes a transformer having a primary coil receiving an input voltage and a secondary coil transmitting an output voltage, a switch having a gate electrode, a first electrode, and a second electrode that is connected to the primary coil, and a switching controller having a feedback terminal that receives a feedback voltage corresponding to the output voltage and controlling the switch. The driving method includes determining the maximum current value flowing between the second electrode and the first electrode of the switch, generating a burst voltage by compensating the feedback voltage according to the maximum current value, determining whether to perform a burst mode operation according to the burst voltage, and transmitting a gate signal according to performance of the burst mode operation to the gate electrode of the switch.

According to the exemplary embodiments of the present invention, a burst voltage is controlled by changing a current limit value by modifying the size of an externally connected resistor to thereby operate the power converter in a burst mode with a user-desired burst voltage.

DETAILED DESCRIPTION OF THE EMBODIMENTS

Figure 1:
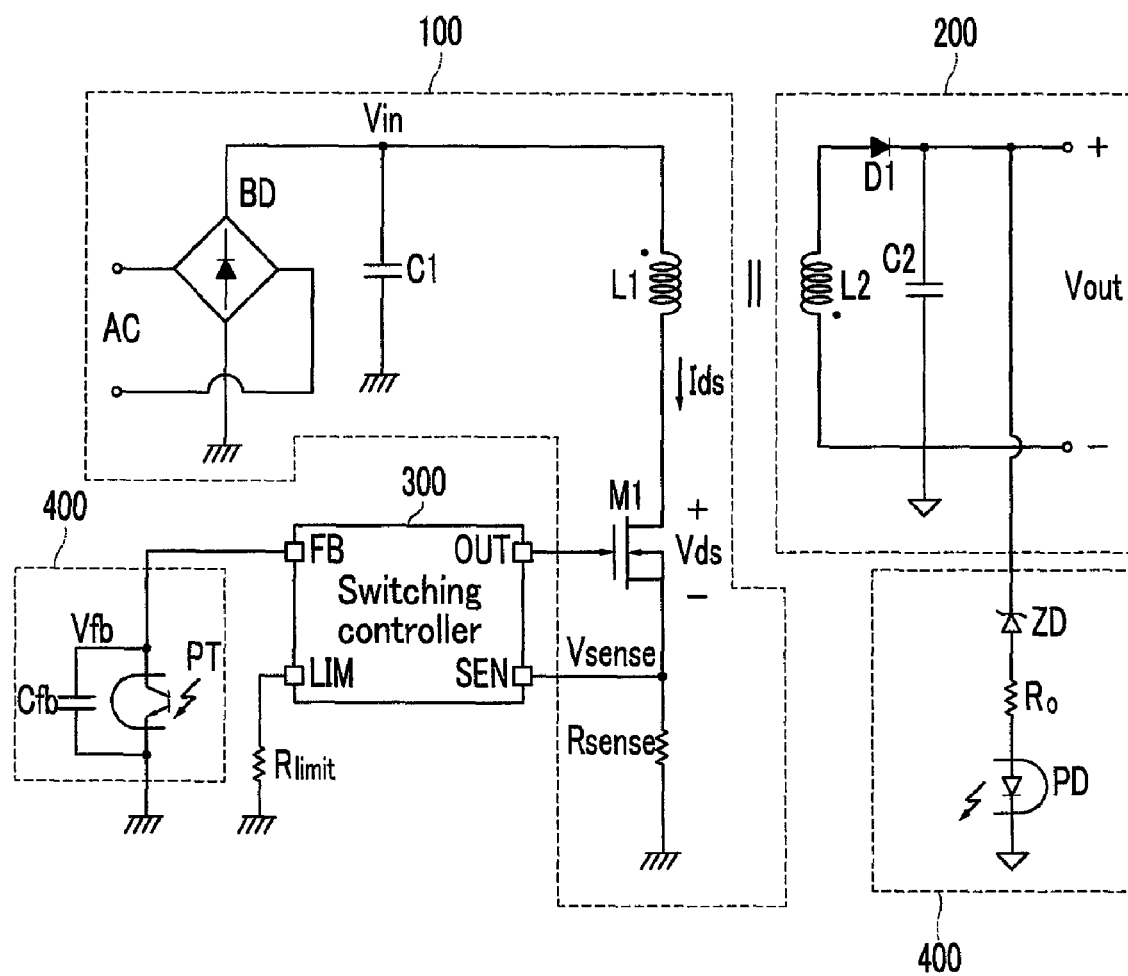
FIG. 1 shows a power converter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A power converter, a switching controller of the power converter, and a driving method of the power converter will be described with reference to the drawings.

Figure 2:
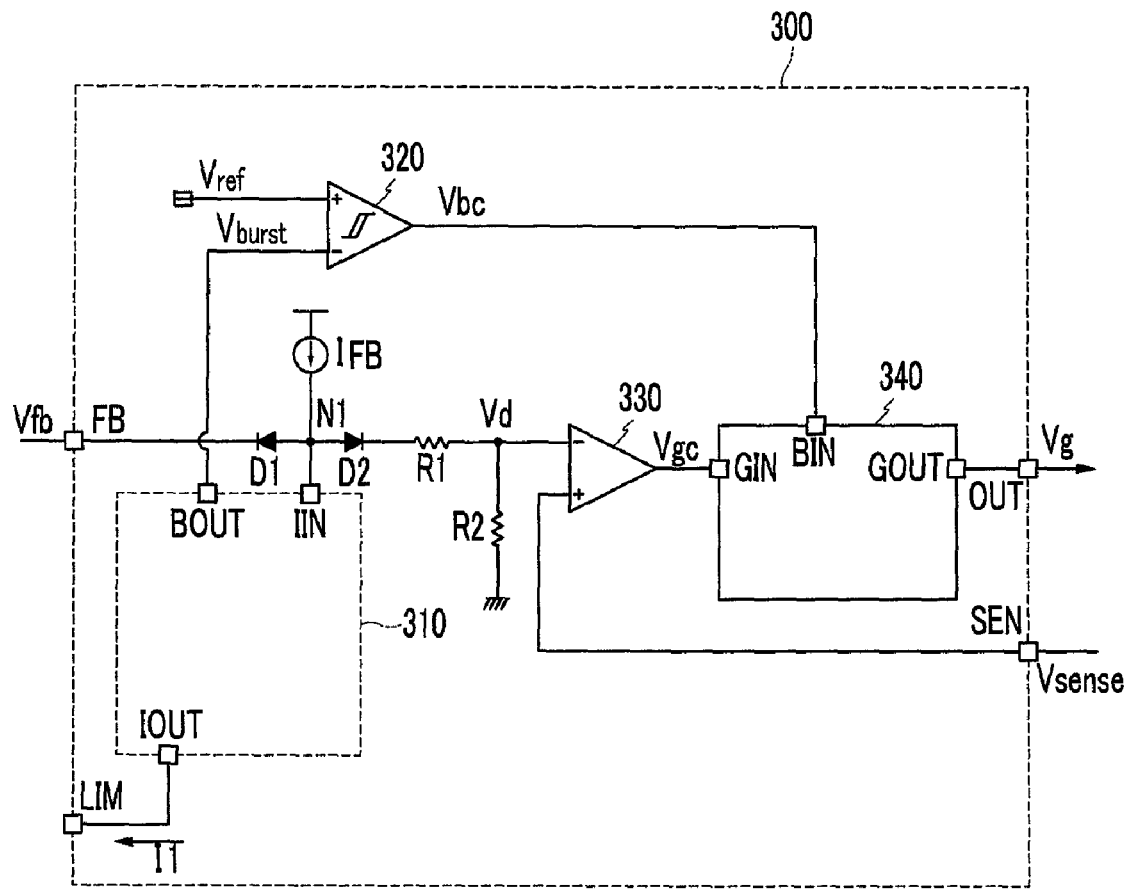
FIG. 2 shows a switching controller according to the exemplary embodiment of the present invention.
Figure 3:
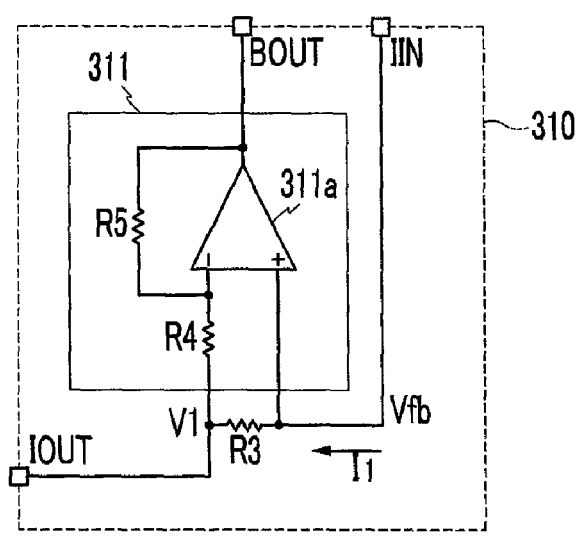
FIG. 3 shows a burst voltage controller of the switching controller of FIG. 2.
Figure 4:
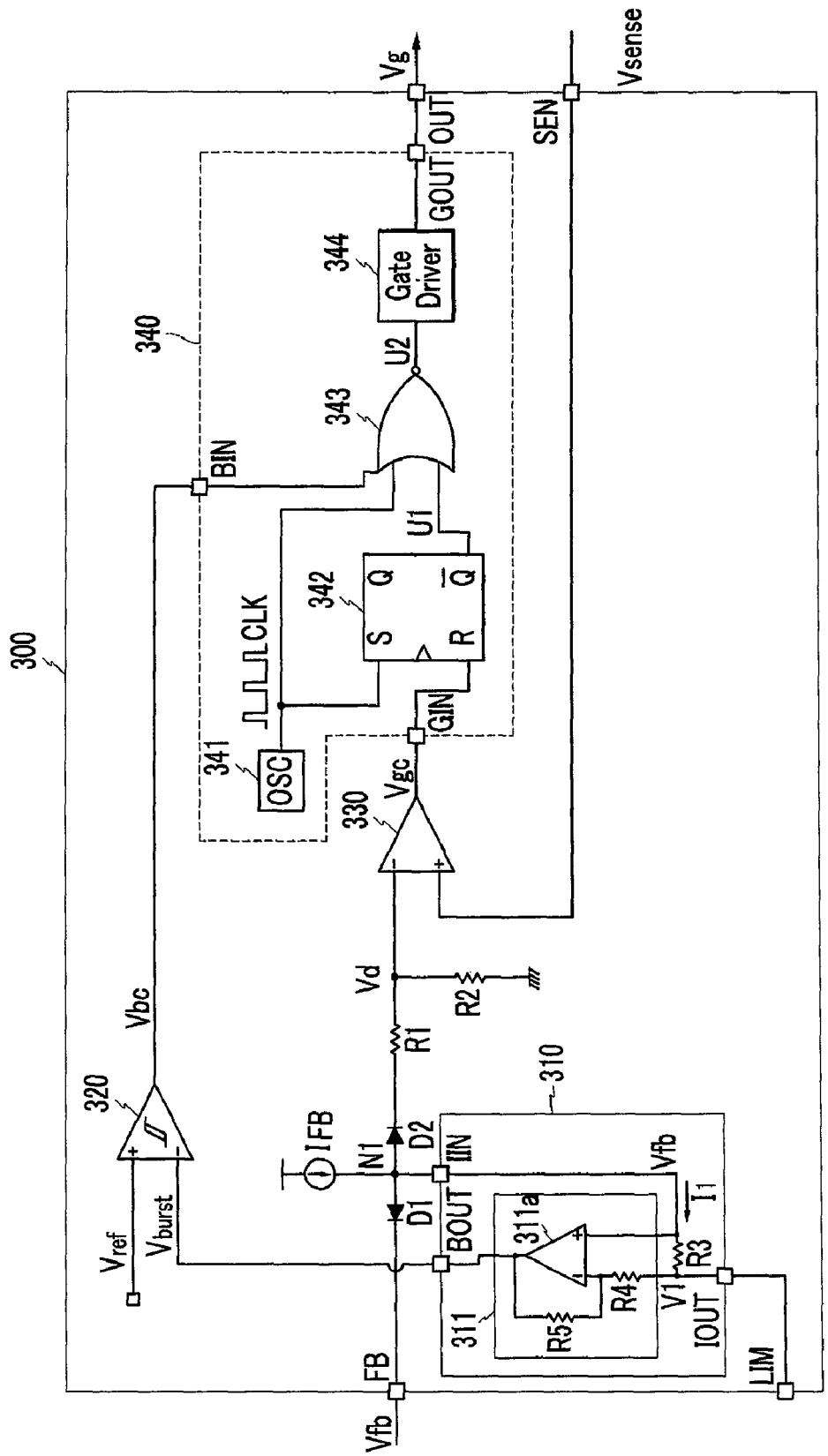
FIG. 4 shows a switching controller that includes an example of a gate signal generator.

FIG. 1 shows a power converter according to an exemplary embodiment of the present invention, FIG. 2 shows a switching controller according to the exemplary embodiment, FIG. 3 shows an example of a burst voltage controller of the switching controller of FIG. 2, and FIG. 4 shows a switching controller that includes an example of a gate signal generator.

Referring to FIG. 1, a power converter according to an exemplary embodiment of the present invention includes a power supply unit 100, an output unit 200, a switching controller 300, and a feedback circuit 400.

The power supply unit 100 includes a full-wave bridge rectifier BD for rectifying an AC input, a capacitor C1 for smoothing the rectified voltage, a transformer having a primary coil L1 of which a first end is connected to the full-wave bridge rectifier BD, a switch M1, and a sensing resistor Rsense.

The switch M1 includes a gate electrode as a control electrode, a drain electrode, and a source electrode. The drain electrode of the switch M1 is connected to a second end of the primary coil L1 of the transformer, and the source electrode of the switch M1 is connected to the sensing resistor Rsense. In FIG. 1, it is assumed that the switch M1 is an n-channel metal oxide semiconductor field effect transistor (MOSFET), but a transistor of a different channel or type may be used as the switch M1.

The sensing resistor Rsense is connected between the source electrode and a ground end of the switch M1, and when the switch M1 is turned on, the sensing resistor Rsense senses a switch current Ids flowing from the drain electrode to the source electrode of the switch M1. A sense voltage Vsense is determined corresponding to the switch current Ids, and is input to the switching controller 300.

The output unit 200 includes a secondary coil L2 of the transformer, a diode D1, and a capacitor C2.

A first end of the secondary coil L2 of the transformer is connected to an anode of the diode D1, and a cathode of the diode D1 is connected to an output end (+). A first end of the capacitor C2 is connected to the output end (+), and a second end thereof is connected to an output end (−). A voltage between the two output ends (+ and −) is an output voltage Vout of the power converter.

The switching controller 300 receives a feedback voltage Vfb and the sense voltage Vsense respectively through a feedback terminal FB and a sense voltage terminal SEN. A resistor $R_{limit}$ is connected between a current limit terminal LIM and a ground end of the switching controller 300, and the maximum current value of the switch current Ids, that is, a current limit $I_{limit}$ of the switch current Ids, is determined by the size of the resistor $R_{limit}$. The switching controller 300 determines a burst voltage $V_{burst}$ in a burst mode according to the current limit $I_{limit}$ and the size of the resistor $R_{limit}$.

A gate signal output terminal OUT of the switching controller 300 is connected to the gate electrode of the switch M1. The switching controller 300 generates a clock signal having a predetermined period, and generates a gate signal Vg according to a clock signal CLK, a burst voltage $V_{burst}$, and a U1 signal (shown in FIG. 4), and outputs the gate signal Vg to the gate signal output terminal OUT. As described above, when the switch M1 is an n-channel transistor, the gate signal Vg has a high voltage for turning on the switch M1 or a low voltage for turning off the switch M1. Although unlikely, when the switch M1 is a p-channel transistor, the gate signal Vg has a low voltage for turning on the switch M1 or a high voltage for turning off the switch M1.

The feedback circuit 400 includes a resistor Ro, a Zener diode ZD, a photodiode PD, a capacitor Cfb, and a phototransistor PT. The resistor Ro, the Zener diode ZD, and the photodiode PD are connected in series between the output end (+) and a predetermined power source (e.g., the ground end). The photo-transistor PT is connected between the feedback terminal FB of the switching controller 300 and the predetermined power source (e.g., the ground end), and forms a photo-coupler (also referred to as an opto-coupler) with the photodiode PD.

When a current flows through the photodiode PD according to the output voltage Vout and thus the photodiode PD emits light, the light from the photodiode PD is transmitted to a base of the phototransistor PT and a current corresponding to the light flows from a collector of the phototransistor PT to an emitter thereof. Excluding the current flowing to the phototransistor PT, currents supplied to the feedback terminal FB by a current source of the switching controller 300 are supplied to a capacitor Cfb, and accordingly, a feedback voltage Vfb is charged in the capacitor Cfb. Accordingly, when the output voltage Vout is high, a low feedback voltage Vfb is charged in the capacitor Cfb, and when the output voltage Vout is low, a high feedback voltage Vfb is charged in the capacitor Cfb. In this case, a circuit other than the photo-coupler may be used as the feedback circuit.

Referring to FIG. 2, the switching controller 300 according to the exemplary embodiment of the present invention includes a burst voltage controller 310, comparators 320 and 330, resistors R1 and R2, diodes D1 and D2, a current source $I_{FB}$, and a gate signal generator 340.

The burst voltage controller 310 includes a current input terminal IIN, a current output terminal IOUT, and a burst voltage output terminal BOUT. The current input terminal IIN of the burst voltage controller 310 is connected to a node N1 to which anodes of the two diodes D1 and D2 are commonly connected, and the current source $I_{FB}$ supplies a current to the node N1. Such a current source $I_{FB}$ corresponds to a current source for generating the feedback voltage Vfb. A cathode of the diode D1 is connected to the feedback terminal FB, and the two resistors R1 and R2 are connected in series between a cathode and a ground end of the diode D2. In this case, a voltage of the node N1 can be maintained with a value that is close to the feedback voltage Vfb of the feedback terminal FB by the diode D1. It is assumed that the voltage of the node N1 is the same as the feedback voltage Vfb in the following description.

The current output terminal IOUT of the burst voltage controller 310 is connected to the current limit terminal LIM, and a current $I_1$ flowing from the current input terminal IIN to the current output terminal IOUT, that is, to the current limit terminal LIM, is determined by the resistor $R_{limit}$. In addition, the burst voltage controller 310 determines a burst voltage $V_{burst}$ based on the resistor $R_{limit}$ (or, the current limit value $I_{limit}$ of the current $I_1$ is determined on the basis of the resistor $R_{limit}$) and the feedback voltage Vfb at the node N1, and transmits the burst voltage $V_{burst}$ to the comparator 320 through the voltage output terminal BOUT.

The comparator 320 includes a non-inversion terminal (+), an inversion terminal (−), and an output terminal, and generates a burst control signal Vbc by comparing the burst voltage $V_{burst}$ input to the inversion terminal (−) and a burst reference voltage $V_{ref}$ input to the non-inversion terminal (+) and transmits the burst control signal Vbc to the gate signal generator 340 through the output terminal. The comparator 320 has a hysteresis characteristic, and compares two threshold voltages (i.e., a threshold low voltage $V_{refL}$ and a threshold high voltage $V_{refH}$) determined by the burst reference voltage $V_{ref}$ with the burst voltage $V_{burst}$. That is, when the burst voltage $V_{burst}$ is increased higher than the threshold high voltage $V_{refH}$, the comparator 320 outputs a low-level burst control signal Vbc, and when the burst voltage $V_{burst}$ is decreased lower than the threshold low voltage $V_{refL}$, the comparator 320 outputs a high-level burst control signal Vbc.

The comparator 330 includes an inversion terminal (−) connected to a node of the two resistors R1 and R2, a non-inversion terminal (+) that receives the sense voltage Vsense, and an output terminal. Such a comparator 330 compares a voltage of the node N1 in a normal mode, that is, a voltage divided from the feedback voltage Vfb by the two resistors R1 and R2, with the sense voltage Vsense to generate a gate control signal Vgc, and outputs the gate control signal Vgc through the output terminal. When the divided voltage Vd is higher than the sense voltage Vsense, the comparator 330 outputs a low-level gate control signal Vgc, and when the divided voltage Vd is lower than the sense voltage Vsense, the comparator 330 outputs a high-level gate control signal Vgc.

The gate signal generator 340 includes a burst voltage input terminal BIN, a gate control signal input terminal GIN, and a gate control signal output terminal GOUT. The burst voltage input terminal BIN is connected to the output terminal of the comparator 320 and receives the burst control signal Vbc therethrough. The gate control signal input terminal GIN is connected to the output terminal of the comparator 330 and receives the gate control signal Vgc therethrough. The gate signal generator 340 generates a gate signal Vg for turning on/off the switch M1 by using the burst control signal Vbc and the gate control signal Vgc. In the standby mode, when a low-level burst control signal Vbc is input from the comparator 320, the gate signal generator 340 generates a gate signal Vg to iteratively perform turn-on/off of the switch M1 according to the gate control signal Vgc. As described, when the burst control signal Vbc is low, a period during which the switch M1 is iteratively turned on/off according to the gate signal Vg is set to a first period. When a high-level burst control signal Vbc is input from the comparator 320, the gate signal generator 340 generates a gate signal Vg for maintaining the switch M1 in the turn-off state. As described, when the burst control signal Vbc is high, a period during which the switch M1 is maintained in the turn-off state according to the gate signal Vg is set to a second period. As described, the first period and the second period that are determined by the feedback voltage Vfb in the standby mode are repeated such that the power converter operates in a burst mode. Since the burst control signal Vbc is always a low-level signal in the normal mode, the gate signal generator 340 generates a gate signal Vg according to the gate control signal Vgc to maintain the output voltage Vout in the normal mode.

When the diode D1 is blocked and the sense voltage Vsense is the same as the divided voltage Vd by the resistors R1 and R2, the switch current Ids reaches the maximum. When the resistor $R_{limit}$ is not connected to the current limit terminal LIM, that is, the current limit terminal LIM is open, all the currents of the current source $I_{FB}$ flow to both of the resistors R1 and R2 so that Equation 1 can be established. In addition, when the resistor $R_{limit}$ is connected to the current limit terminal $R_{limit}$, the current of the current source $I_{FB}$ is divided to the two resistors R1 and R2 so that Equation 2 can be established.

$$I_{MAX} * R\text{sense} = I_{FB} * R2 \qquad \text{[Equation 1]}$$

Here, $I_{MAX}$ is a maximum value of the switch current Ids when the current limit terminal LIM is open.

$$I_{limit} * R\text{sense} = \frac{R_{limit} * R2}{R_{limit} + R1 + R2} * I_{FB} \qquad \text{[Equation 2]}$$

For convenience of description, resistance between the current input terminal IIN and the current output terminal IOUT of the burst voltage controller 310 was not considered in Equation 2.

From Equation 1 and Equation 2, Equation 3 can be substantially established between the current limit value $I_{limit}$ and the resistor $R_{limit}$, and the maximum current value $I_{limit}$ of the switch current Ids can be determined by the resistor $R_{limit}$ in Equation 3.

$$I_{limit} = \frac{I_{MAX} * R_{limit}}{R1 + R2 + R_{limit}} \qquad \text{[Equation 3]}$$

Referring to FIG. 3, the burst voltage controller 310 includes a resistor R3 connected between the current input terminal IIN and the current output terminal IOUT and a level compensator 311 connected to both terminals of the resistor R3. The level compensator 311 includes, for example, an amplifier 311a (e.g., an operation amplifier) and resistors R4 and R5.

A non-inversion terminal (+) of the amplifier 311a is connected to the first terminal of the resistor R3 connected to the current input terminal IIN and receives the voltage of the node N1, that is, the feedback voltage Vfb. The resistor R4 is connected between an inversion terminal (−) of the amplifier 311a and the second terminal of the resistor R3. The resistor R5 is connected between the inversion terminal (−) and an output terminal of the amplifier 311a, and outputs the burst voltage $V_{burst}$ through the output terminal of the amplifier 311a. In this case, when a voltage V1 is applied to the second terminal of the resistor R3 by a current $I_1$ flowing through the resistor R3, the burst voltage $V_{burst}$ can be obtained as given in Equation 4.

$$V_{burst} = Vfb + \frac{R5}{R4}(Vfb - V1)$$ [Equation 4]

As shown in Equation 4, the burst voltage $V_{burst}$ is given as a sum of the feedback voltage Vfb and an offset voltage $$\left[\frac{R5}{R4}(Vfb - V1)\right].$$

In this case, when the resistor $R_{limit}$ is not connected to the current limit terminal LIM, that is, when the current limit terminal LIM is open, the feedback voltage Vfb and the voltage V1 are the same, and accordingly, the burst voltage $V_{burst}$ and the feedback voltage Vfb become the same. When the resistor $R_{limit}$ is connected to the current limit terminal LIM and thus the current limit value $I_{limit}$ is decreased, a voltage drop amount (Vfb−V1) through the resistor R3 is increased so that the offset voltage is increased. Therefore, the burst voltage $V_{burst}$ becomes the same as the threshold high voltage $V_{refH}$ (i.e., $V_{burst} = V_{refH}$) even though the feedback voltage Vfb is low so that a rated load to output load ratio in burst mode operation can be constantly maintained even though the current limit $I_{limit}$ is decreased.

For example, when the current limit value $I_{limit}$ is 2.5 A in the state in which the threshold high voltage $V_{refH}$ of the burst reference voltage $V_{ref}$ is 0.5V and the current limit terminal LIM is open, the feedback voltage is 0.5V if it is assumed that the power converter is operated in the burst mode and an output load of the power converter is 20% of the rated load. In this condition, the output load becomes 20% of the rated load when the feedback voltage Vfb is 0.34V (i.e., 68% of 0.5V) if the current limit value $I_{limit}$ is set to 1.686 A (i.e., 68% of 2.5 A) by connecting the resistor $R_{limit}$ to the current limit terminal LIM. Since the threshold high voltage $V_{refH}$ of the burst reference voltage $V_{ref}$ is set to 0.5V, a 0.34V feedback voltage Vfb and a 0.16V offset voltage are required for burst mode operation. When the feedback voltage Vfb becomes 0.34V and the offset voltage becomes 0.16V by setting the size of the resistors R4 and R5 with Equation 4, the output load becomes 20% of the rated load so that the burst voltage $V_{burst}$ becomes 0.5V and the power converter operates in the burst mode.

Referring to FIG. 4, the gate signal generator 340 includes an oscillator 341, an SR latch 342, a NOR gate 343, and a gate driver 344.

The oscillator 341 generates a clock signal CLK having a predetermined period, and transmits the clock signal CLK to a set terminal S of the SR latch 342 and the NOR gate 343.

The SR latch 342 has the set terminal S that receives the clock signal CLK, a reset terminal R that receives a gate control signal Vgc, an output terminal Q, and an inversion output terminal /Q. The SR latch 342 transmits an output U1 of the SR latch 342 according to the gate control signal Vgc and the clock signal CLK to the NOR gate 343 through the inversion output terminal /Q. The SR latch 342 outputs a low-level signal U1 when a high-level signal is input to the set terminal S, and outputs a high-level signal U1 when the high-level signal is input to the reset terminal R.

The NOR gate 343 carries out an NOR operation with the burst control signal Vbc, the clock signal CLK, and the output U1, generates an output U2 and transmits the output U2 to the gate driver 344. The gate driver 344 generates a gate signal Vg having a high voltage when the output signal U2 of the NOR gate 343 is high and outputs the gate signal Vg to the gate electrode, and when the output signal U2 of the NOR gate 343 is low, the gate driver 344 generates a gate signal Vg having a low voltage and outputs the gate signal Vg to the gate electrode of the switch M1.

Operation of the power converter will be described with reference to FIG. 5A and FIG. 5B.

Figure 5A:
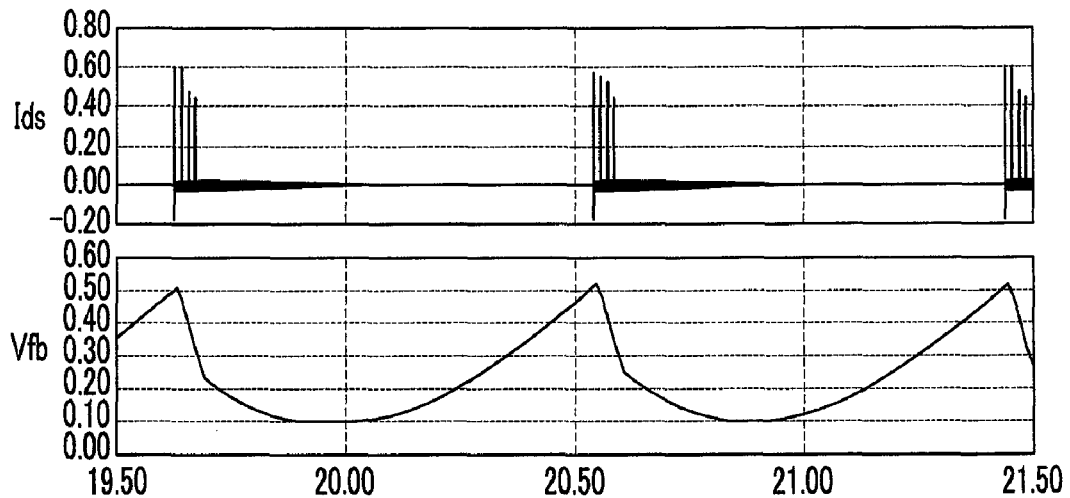
FIG. 5A and FIG. 5B respectively show operation in a standby mode in cases of current limit values of 2.5 A and 1.686 A, respectively.
Figure 5B:
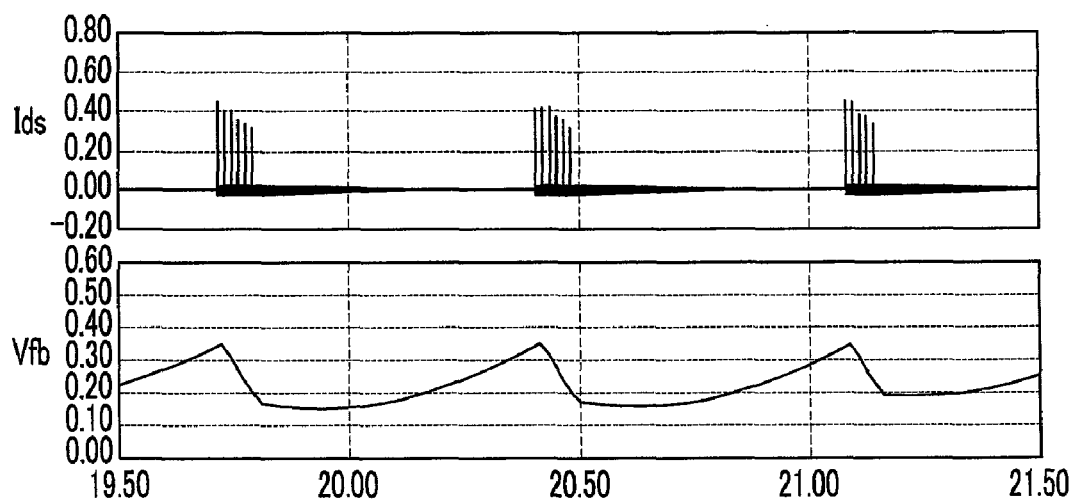

FIG. 5A and FIG. 5B respectively show operation of the power converter in the standby mode in the case in which the current limit value $I_{limit}$ is 2.5 A and in the case in which the current limit value $I_{limit}$ is 1.686 A.

When the output voltage Vout is sufficiently high in the standby mode, that is, when the feedback voltage Vfb becomes lower than the threshold low voltage $V_{refL}$, the comparator 320 outputs a high-level burst control signal Vbc. Then, the output U2 of the NOR gate 343 of the gate signal generator 340 becomes low-level, and therefore, the gate driver 344 outputs a low-level gate signal Vg to maintain the switch in the turn-off state. When the switch M1 is maintained in the turn-off state, the output voltage Vout is decreased so that the feedback voltage Vfb is increased. Referring to FIG. 5A, when the feedback voltage Vfb is increased to 0.5V, the comparator 320 outputs a low-level burst control signal Vbc so that the switch M1 starts switching operation.

Since the switch M1 is in the turn-off state at the moment that the feedback voltage Vfb reaches the threshold high voltage $V_{refH}$, the switch current Ids is not provided so that the sense voltage Vsense becomes lower than the divided feedback voltage Vd. Accordingly, the SR latch 342 receives a low-level gate control signal Vgc to the reset terminal R thereof. In this case, when the oscillator 341 changes the clock signal CLK to the high level, the NOR gate 343 receives a high-level clock signal CLK from the oscillator 341 and receives a low-level signal U1 from the SR latch 342. Subsequently, since the burst control signal Vbc is low-level when the clock signal CLK is changed to the low level, all the inputs of the NOR gate 343 are low-level so that the NOR gate 343 outputs a high-level signal U2. Accordingly, the gate driver 344 outputs a gate signal Vg of a high voltage to turn on the switch M1.

When the switch M1 is turned on, a switch current Ids flowing to the switch M1 is increased so that the sense voltage Vsense is increased. When the sense voltage Vsense becomes higher than the divided feedback voltage Vd, the comparator 330 outputs a high-level gate control signal Vgc. According to the high-level signal Vgc input to the reset terminal R, the SR latch 342 outputs a high-level signal U1 to the inversion output terminal /Q. Then, the NOR gate 343 outputs a low-level signal U2, and the gate driver 344 outputs a gate signal Vg of a low voltage so as to turn off the switch M1.

By repeating the above-described switching operation, the output voltage Vout is increased, and accordingly the feedback voltage Vfb is decreased. When the feedback voltage Vfb is decreased to 0.20V, the comparator 320 outputs a high-level burst control signal Vbc. Accordingly, the switching controller 300 maintains the switch M1 in the turn-off state to thereby stop the switching operation. By repeating the above-described process (i.e., repeating the switching operation and maintaining the turn-off state of the switch M1), the power converter performs the burst mode operation.

Meanwhile, referring to FIG. 5B, when the feedback voltage Vfb is increased to 0.34V, the burst voltage $V_{burst}$ reaches the threshold high voltage $V_{refH}$ so that the switching controller 300 performs the switching operation. Accordingly, when the output voltage Vout is increased so that the feedback voltage Vfb is decreased and the feedback voltage Vfb becomes 0.20V, the burst voltage $V_{burst}$ reaches the threshold low voltage $V_{refL}$ so that the switching controller 300 maintains the switch M1 in the turn-off state to thereby stop the switching operation. By repeating the above-described process, the power converter performs the burst mode operation.

As described, when the current limit value $I_{limit}$ is changed even though the burst reference voltage $V_{ref}$ is constant, the feedback voltage Vfb provided in the burst mode can be compensated with an offset voltage, and therefore, the power converter can perform the burst mode operation with the same output load.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power converter comprising:
   a power supply unit including a primary coil of a transformer that receives an input voltage, and a switch having a gate electrode, a first electrode, and a second electrode that is connected to the primary coil;
   an output unit including a secondary coil of the transformer, and outputting an output voltage that is converted from the input voltage by the transformer; and
   a switching controller including a feedback terminal that receives a feedback voltage corresponding to the output voltage, generates a burst voltage by compensating the feedback voltage according to a maximum current value that can flow between the second electrode and the first electrode of the switch, determines whether to perform a burst mode operation according to the burst voltage, and transmits a gate signal according to performance of the burst mode operation to the gate electrode of the switch.

2. The power converter of claim 1, wherein the switching controller further comprises a current limit terminal, and determines the maximum current value according to a size of a resistor connected to the current limit terminal.

3. The power converter of claim 1, wherein the switching controller compensates the feedback voltage by adding an offset voltage to the feedback voltage, and the offset voltage is increased in the case that the maximum current value is decreased.

4. The power converter of claim 3, wherein the switching controller comprises:
   a burst voltage controller that generates the burst voltage by compensating the feedback voltage with the offset voltage according to the maximum current value;
   a first comparator that outputs a burst control signal by comparing the burst voltage with a burst reference voltage;
   a second comparator that outputs a gate control signal by comparing a first voltage that corresponds to the feedback voltage with a second voltage according to a current flowing between the second electrode and the first electrode of the switch; and
   a gate signal generator that generates the gate signal by using the burst control signal and the gate control signal.

5. The power converter of claim 4, wherein the switching controller further comprises:
   a current source that is connected to a node at which the feedback voltage is applied and supplies a current to the node; and
   first and second resistors connected between the node and a ground end and that output the first voltage to contact points of the first and second resistors between the node and the ground end, and
   the burst voltage controller is connected between the node and the current limit terminal and compensates the feedback voltage by determining the offset voltage according to a current flowing between the node and the current limit terminal.

6. The power converter of claim 5, wherein the burst voltage controller comprises:
   a third resistor connected between the node and the current limit terminal; and
   a voltage compensator that compensates the feedback voltage by determining the offset voltage according to a voltage at both ends of the third resistor.

7. The power converter of claim 6, wherein the voltage compensator further comprises:
   an amplifier including a non-inversion terminal, an inversion terminal, and an output terminal, the non-inversion terminal connected to a first end of the third resistor;
   a fourth resistor connected between the inversion terminal and a second end of the third resistor; and
   a fifth resistor connected between the inversion terminal and the output terminal.

8. The power converter of claim 4, wherein the first comparator comprises a hysteresis comparator.

9. A switching controller of a power converter including a transformer having a primary coil receiving an input voltage and a secondary coil transmitting an output voltage, and a switch having a control electrode, a first electrode, and a second electrode connected to the primary coil, comprising:
   a current source connected to a node to which a feedback voltage corresponding to the output voltage is applied and supplying a current to the node;
   a burst voltage controller connected between a current limit terminal that determines a maximum current value between the second and first electrodes of the switch and the node, and generates a burst voltage by compensating the feedback voltage according to a current flowing between the node and the current limit terminal;
   a first comparator that generates a burst control signal by comparing the burst voltage with a burst reference voltage; and
   a gate signal generator that generates a gate signal that turns on/off the switch according to a first signal and the burst control signal, the first signal generated by comparison between a first voltage corresponding to the feedback voltage and a second voltage according to the current flowing between the first and second electrodes of the switch.

10. The switching controller of claim 9, wherein the burst voltage controller comprises:
    a first resistor having a first end connected to the node and a second end connected between the node and the current limit terminal; and
    a voltage compensator that determines an offset voltage according to a voltage at both ends of the first resistor, and compensates the feedback voltage by adding the feedback voltage and the offset voltage.

11. The switching controller of claim 10, wherein the voltage compensator further comprises:
    an amplifier including a non-inversion terminal, an inversion terminal, and an output terminal, the non-inversion terminal connected to the first end of the first resistor;
    a second resistor connected between the inversion terminal and the second end of the first resistor; and
    a third resistor connected to the inversion terminal and the output terminal.

12. The switching controller of claim 9, further comprising a second comparator that outputs the first signal by comparing the first voltage with the second voltage.

13. The switching controller of claim 12, wherein the gate signal generator comprises:
- a logic device that outputs a second signal of a second level without regard to the first signal when the burst control signal is a first level, and outputs the second signal having a level that depends on the first signal when the burst control signal is a third level that is different from the first level; and
- a gate driver that generates the gate signal according to the second signal.

14. The switching controller of claim 13, wherein the gate signal generator further comprises an oscillator that generates a clock signal having a predetermined period and an SR latch that receives the first signal and the clock signal and outputs a third signal according to the first signal and the clock signal, and the logic device operates the clock signal, the third signal, and the burst control signal.

15. The switching controller of claim 9, wherein the first comparator comprises a hysteresis comparator.

16. A driving method of a power converter that includes a transformer having a primary coil receiving an input voltage and a secondary coil transmitting an output voltage, a switch having a gate electrode, a first electrode, and a second electrode that is connected to the primary coil, and a switching controller having a feedback terminal that receives a feedback voltage corresponding to the output voltage and controlling the switch, comprising:
- determining a maximum current value flowing between the second electrode and the first electrode of the switch;
- generating a burst voltage by compensating the feedback voltage according to the maximum current value;
- determining whether to perform a burst mode operation according to the burst voltage; and
- transmitting a gate signal according to performance of the burst mode operation to the gate electrode of the switch.

17. The driving method of claim 16, wherein the generating of the burst voltage further comprises generating the burst voltage by adding an offset voltage according to the maximum current value to the feedback voltage, and the offset voltage is increased when the maximum current value is decreased.

* * * * *